June 18, 1935. A. G. MARANVILLE 2,005,626
AIRCRAFT LANDING WHEEL
Filed Aug. 25, 1933
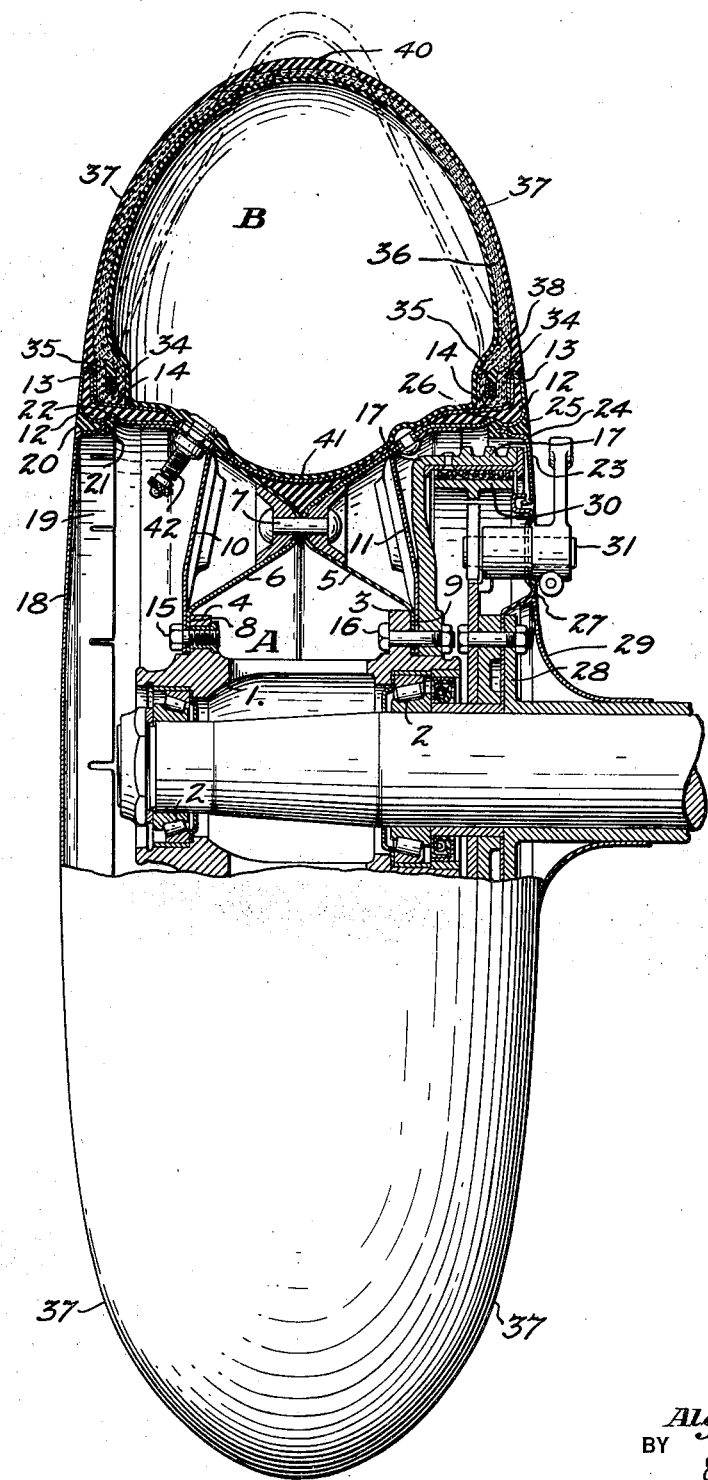
INVENTOR
*Alger G. Maranville*
BY
*Evans & McCoy*
ATTORNEY Patented June 18, 1935

2,005,626

UNITED STATES PATENT OFFICE 2,005,626

AIRCRAFT LANDING WHEEL

Alger G. Maranville, Akron, Ohio, assignor to General Tire & Rubber Company, Akron, Ohio, a corporation of Ohio Application August 25, 1933, Serial No. 686,743

4 Claims. (Cl. 152—29)

This invention relates to aircraft landing wheels and is a continuation in part of my co-pending application Serial No. 426,333, filed February 6, 1930 that relates to a specific embodiment of the invention broadly claimed herein.

The present invention has for its object to provide a streamlined wheel and tire assembly consisting of a wheel body and a pneumatic tire in which the tire and wheel body are so constructed as to provide a landing wheel which is of streamline form when the tire is inflated and which has a low wind resistance in flight, effecting a material saving in fuel consumption and enabling an aircraft to attain a maximum speed higher than that of the same aircraft equipped with landing wheels such as heretofore used.

More particularly it is the object of the invention to provide an aircraft landing wheel in which the form of the inflated pneumatic tire and of the side covering closure walls forming the faces of the wheel body are such that the wheel is substantially of oval form in any axial cross section when the aircraft is in flight.

A further object of the invention is to provide a landing wheel having a pneumatic tire which is of ovate-cross-sectional form upon inflation and in which the curvature of the tread portion is greater than in the side walls and in which the curvature gradually decreases from the tread portion to the base of the tire where the side faces of the tire are substantially flush with the side faces of the wheel body.

A further object of the invention is to provide a landing wheel with a pneumatic tire which has a narrow tread, which is circumferentially compressed and reduced to a smaller diameter upon inflation of the tire, but which is sufficiently resistant to circumferential compression to retain the tread at a diameter in excess of that which the tire would assume if it were forced by the internal air pressure to a shape round in transverse section, so that the tire when inflated tapers from the tread to the base where the side faces of the tire merge into the side faces of the wheel body.

With the above and other objects in view, the invention may be said to comprise the landing wheel as illustrated in the accompanying drawing hereinafter described and particularly set forth in the appended claims, together with such variations and modifications thereof as will be apparent to one skilled in the art to which the invention appertains.

Reference should be had to the accompanying drawing forming a part of this specification in which there is shown a front elevation of a landing wheel embodying the invention, with the upper half of the wheel broken away and shown in axial cross section, and the outline of the tire uninflated shown in dotted lines.

It has been found advantageous in aeroplane landing wheels to employ tires of large air capacity which are operated at low inflation pressures, so that the ground contact area increases rapidly under increased load, and there is less rebound than with a tire of small air capacity and high inflation pressure.

A serious objection to large, low pressure tires for airplane landing wheels has been that they offer objectionable wind resistance during flight because they present large areas disposed nearly normal to the direction of flight, and for the reason that the drag is materially increased by the side face recesses within the bulging sides of the tires.

The improvement of the present invention consists in forming a large capacity, low pressure tire and the supporting wheel body in such manner that the landing wheel has a streamline shape and a minimum wind resistance in flight.

Referring to the accompanying drawing in which like numerals refer to like parts throughout the several views, the wheel assembly shown in Figure 1 comprises a wheel body A which may embody the structure disclosed and claimed in my co-pending application Serial No. 592,317, filed February 11, 1932, and a pneumatic tire B which is claimed per se in my co-pending application Serial No. 628,869, filed August 15, 1932, which matured as Patent No. 1,969,088, Aug. 7, 1934.

The aircraft landing wheel of the present invention is characterized by the fact that the wheel body A is of relatively small diameter as compared to the overall diameter of the wheel, and the pneumatic tire B of relatively great radial depth.

The wheel assembly is further characterized by the fact that in axial planes the external outline of the wheel has the form of an elongated oval, gradually increasing in width from the tread to the axis and gradually decreasing in curvature from the tread to the axis, the side covering walls forming the faces of the wheel body being formed to provide continuations of the side faces of the tire so that the side faces of the wheel are substantially continuous and smooth throughout, providing no recesses to form eddy currents and providing a wheel of a shape such that it offers a minimum air resistance in flight. The axial dimensions of the wheel are so proportioned to the overall diameter as to provide the required strength and stability, the width of the wheel at the base of the tire being preferably slightly greater than the radial depth of the pneumatic tire when inflated so that the tire not only provides a deep cushion but also has a tapering form which enables the tire to effectively resist heavy lateral thrusts.

The structure of the wheel body may be varied greatly. It may be considered as simply a hub member provided with external tire seating means, since its diameter as compared to the overall diameter of the wheel is relatively small and its construction strong and rigid to provide a suitable mounting for a deep streamline pneumatic tire which is formed in such manner as to maintain a shape ovate in cross section upon inflation with its internal curvature greater at the tread and gradually decreasing from the tread to the base.

In the wheel structure illustrated in the drawing, the wheel is provided with a central hub casting 1 which is counterbored at its ends to receive roller bearings 2, and provided adjacent its opposite ends with outwardly projecting circumferential flanges 3 and 4 to which are attached sheet metal tire supporting members which form the tire supporting or rim portion of the wheel. The rim portion comprises two similar annular sheet metal members 5 and 6 formed to provide outwardly facing channels and secured together at the bottoms of the laterally facing channels by suitable means such as rivets 7. At their interior margins, members 5 and 6 have flanges 8 and 9 which are secured to flanges 3 and 4 of the hub casting. The abutting face portions of the members 5 and 6 are relatively narrow and the trough shaped side members diverge outwardly from their connected base portions to provide a diagonally braced structure which is reinforced by annular discs 10 and 11 which are secured to the flanges 3 and 4 of the hub casting and to the diverging outer portions of the members 5 and 6. The discs 10 and 11 are slightly dished and converge at a small angle from the hub casting to the rim portion. The members 5 and 6 diverge outwardly from their contacting attached portions to form a central rim channel or well so as to provide a rim of the drop center type. At their outer margins the members 5 and 6 are folded back upon themselves over rubber reinforcing strips 12, the folded reinforced portions being shaped to provide tire retaining flanges 13 and tire seats 14 inwardly of the flanges, as set forth in more detail in my copending application above referred to.

The outer disc 10 and flange 8 are secured to the flange 3 of the hub casting by means of bolts 15 and the inner disc 11 and flange 9 are secured to the inner flange 4 of the hub casting by means of bolts 16. The tire seating portion 14 of the rim portion projects laterally beyond the flanges 3 and 4 of the hub casting and within the inner tire seat there is mounted a brake drum 17 which may be secured to the inner flange 4 of the hub casting by means of the bolts 16, the brake drum 17 lying wholly within the plane of the inner tire retaining flange.

At its outer face the wheel is provided with a side covering wall in the form of an outwardly dished fairing cover plate 18, constituting the outer side face of the wheel body, which has an inturned marginal flange 19 to which is secured a rubber sealing strip 20 provided with a bead 21 engageable in a retaining groove 22 in the tire seating portion of the rim. The exterior surface of the fairing plate and sealing strip are flush with the exterior surface of the outer tire retaining flange, so that the wheel is provided with a smooth, outwardly dished outer side face.

At the inner side of the wheel there is a side covering wall in the form of a fairing cover plate 23, which has its exterior surface shaped substantially to correspond to that of the outer plate 18 and which is provided with a marginal inturned flange 24 and beaded rubber sealing strip 25 which engages a groove 26 upon the interior of the inner tire seating portion of the rim. The inner cover plate is flush with the external surface of the inner tire retaining flange and an inner plate 27 which has an inwardly offset inner marginal portion 27 secured to an axle housing flange 28 is positioned flush with the plate 23. A sheet metal member 29 of generally conical form fits upon the axle housing and covers the inwardly offset inner marginal portion of the inner cover plate 27, the peripheral portion of the member 29 being flush with the cover plate 27. The plates 23, 27 and 29 constitute the inner side face of the wheel body. A suitable internal brake shoe 30 may be mounted on the flange 28 for engagement with the drum 17 and a brake actuating connection 31 may extend through an aperture in the inner cover plate 27 of the inner wheel face within which the brake is housed.

The pneumatic tire B has beads 34 which are provided with inextensible bead rings 35 and also has flexible, stretch resisting reinforcement consisting of a suitable number of plies of cord fabric 36 extending throughout the body of the tire casing from bead to bead. The beads 34 are offset inwardly with respect to the adjacent portions of the side walls of the tire and the tire casing has an outer layer of rubber 37 which has a thickened portion 38 directly over the rim flanges so that the external surface of the tire has inset portions alongside the beads at the base thereof to receive the rim flanges which are flush with the external side faces of the tire. The external rubber covering has a thickened portion 40 at the tread of the tire which stiffens the tread portion and makes it effective to yieldingly resist circumferential compression and hold the tire to a radially elongated cross-sectional form upon inflation.

An inner tube 41 is provided within the tire casing and the inner tube has a valve stem 42 extending through the rim inwardly of the outer bead seat 14 thereof, the projecting portion of the valve stem being in the space between the disc 10 and cover plate 18.

As indicated by dotted lines in the drawing, the tire is molded with its tread oversize and to a form such that, when mounted on its rim and uninflated, the tire is nearly triangular in cross section with the side walls straight and diverging from a relatively sharp tread portion to the base of the tire, the side walls of the tire being substantially flat in axial cross section and converging from the base to the tread when the tire is uninflated. By reason of the form to which the tire is molded, the internal inflation pressure tends to deflect the side walls laterally and to draw the oversize tread portion of the tire to a smaller diameter. The internal pressure would normally draw the casing to a form round in cross section, but, inasmuch as the tread portion is molded to a diameter considerably in excess of the external diameter which the tread would have if the tire were forced to a shape round in cross-section by the internal air pressure, and is constructed to yieldingly resist circumferential compression and lateral deflection of portions of the side walls adjacent the tread portion and limit the contraction of the tread, it is held to a diameter in excess of that which it would have were the tire to assume the round cross sectional shape toward which it is urged by the internal air pressure. The tire upon inflation has an external form substantially ovate in cross-section with a radial depth greater than that which it would have were it to assume a shape circular in cross-section and with its maximum internal curvature (i. e. its minimum radius) in the tread portion, the curvature of the side walls gradually decreasing from the tread to the base of the tire. The result is a tire of relatively great radial depth which has a narrow tread and tapering side walls which form continuations of the side faces of the wheel, thus offering a minimum air resistance during flight.

The width of the base of the tire is such that under inflation the widest portion of the tire is at the base, and the entire external surfaces of the side walls thereof converge from the base to the tread portion, the side walls being bowed outwardly to an extent such that the portions thereof adjacent the base are in nearly vertical position. The pneumatic tire, the faces of which are flush with the side covering walls of the wheel body, completes the oval streamline wheel assembly providing a structure which offers a minimum wind resistance due to its streamline shape.

The tire form has the additional advantage that it increases the depth of the air cushion and, by reason of the compressed elastic tread, a considerable proportion of the loads and shocks are absorbed by the tire casing itself, so that the tire can be successfully operated with a lower internal air pressure and the shock absorbing qualities of the tire are greatly improved. Compression of the rubber tread also makes the tire more resistant to puncture and protects the fabric carcass against bruising in travel over rough surfaces. By reason of the fact that the widest portion of the tire is at the base thereof, damage to the tire by rim cutting and rim riding is substantially eliminated.

It will be noted that the rim seat diameter is approximately one-half of the overall diameter of the wheel assembly, and that the tire is wide at its base, the external width being approximately that of the rim seat radius. There is thus obtained a tire of large volumetric air capacity so that a low air pressure can be successfully used. By "low air pressure" is meant a pressure of the order of five pounds per square inch or less for each inch of width of the base at its outer side. The tire thus has great air capacity and low air pressure.

By reason of the ovate form to which the tire is held upon inflation, the tire has a radial depth materially greater than a tire of the same volumetric air capacity which has the usual round cross sectional shape. The ratio of the radial depth of the tire to the tread radius may be varied considerably, but it has been found that the best streamlining together with adequate cushioning is obtained when the radial depth of the tire measured from the bead base to the tread periphery is approximately one-half of the tread radius of the tire when inflated, as shown in the drawing. When the tire is uninflated the tread diameter is more than twice the bead diameter.

The present invention provides an aircraft landing wheel assembly which has a tire which is of great air capacity and which provides a deep air cushion, due to the ovate form of the tire when inflated, and in addition, the tire by reason of its form, offers a minimum wind resistance and even though the inflation pressure be very low is not distorted by heavy pressure under headwinds during the flight of an aircraft to which it is attached.

Aside from the specific embodiment of the invention herein shown and described, it will be understood that numerous details of the construction may be altered or omitted without departing from the spirit and scope of the invention, and it is to be understood that the invention is not limited to the exact construction shown and described, and that it is intended to claim the invention broadly as well as specifically as indicated in the appended claims.

What I claim is:

1. A streamlined aircraft wheel and pneumatic tire assembly comprising a pneumatic tire of ovate cross sectional form when inflated having side walls which diverge from the tread to the base of the tire, and a wheel body supporting said tire and provided with side covering closure walls which have external side faces shaped to merge with and form continuations of the external surfaces of the side walls of the inflated tire and which complete the streamline form of the entire wheel and tire assembly.

2. A streamlined aircraft wheel and pneumatic tire assembly of generally oval form in axial section and comprising a radially deep pneumatic tire of ovate cross sectional form when inflated, said tire having a compressible oversize tread which is reduced in diameter upon inflation but which retains an internal curvature at the tread in excess of that of the side walls with a gradually decreasing curvature in the side walls from the tread to the base, and a wheel body provided with side covering closure walls which have side faces flush with and forming continuations with the external surfaces of the tire walls, and which complete the streamline form of the entire wheel and tire assembly, the tire having a radial depth which is approximately one-half of the tread radius.

3. A streamlined aircraft wheel and pneumatic tire assembly comprising a pneumatic tire which is radially deep when inflated and in flight, its outside width at the base being greater than its radial depth, the side walls converging from the base to the tread, and a wheel body supporting said tire provided with side covering closure walls which have external side faces shaped to merge with and form continuations of the external surfaces of the side walls of the inflated tire thus completing the streamline form, of the entire wheel and tire assembly, the maximum axial width of the wheel body being but slightly greater than the width of the tire base.

4. A streamlined aircraft wheel and pneumatic tire assembly having the form of an elongated oval in axial cross section and comprising a wheel body having a tire supporting rim and convex cover plates within opposite side edges of the rim, said rim having tire retaining flanges at its side edges, the outer surfaces of which form continuations of the convex surfaces of the cover plates, and a radially deep pneumatic tire of ovate cross sectional form when inflated, said tire having a narrow tread and side walls which taper and increase in curvature from the base to the tread, said tire having beads seated on the rim within the side flanges thereof and the side walls of the tire having the portions thereof immediately adjacent and outwardly of the rim flanges thickened to bring the external surfaces of the side walls of the tire flush with the external surfaces of the side flanges whereby the tire, rim flanges and cover plates provide smooth continuous surfaces at the sides of the wheel.

ALGER G. MARANVILLE.